United States Patent [19]

Yang et al.

[11] Patent Number: 5,283,571
[45] Date of Patent: Feb. 1, 1994

[54] TESTING A COMMUNICATIONS NETWORK FOR DUPLICATE STATION ADDRESSES

[75] Inventors: Henry Yang, Andover; Jerry Hutchison, Littleton; William R. Hawe, Pepperell, all of Mass.; G. Paul Koning, Brookline, N.H.

[73] Assignee: Digital Equipment Corporation, Maynard, Mass.

[21] Appl. No.: 955,221

[22] Filed: Oct. 1, 1992

Related U.S. Application Data

[63] Continuation of Ser. No. 555,861, Jul. 19, 1990, abandoned.

[51] Int. Cl.$^5$ ............................................. H04Q 9/00
[52] U.S. Cl. ..................... 340/825.52; 340/825.170; 371/11.2; 370/92
[58] Field of Search ............... 340/825.52, 825.07, 340/825.16, 825.17, 825.05; 370/13, 14, 15, 16, 16.1, 92; 371/20.4, 20.5, 20.6, 11.2

[56] References Cited

U.S. PATENT DOCUMENTS

| 4,506,360 | 3/1985 | Kryskow, Jr. et al. | 370/85 |
| 4,689,786 | 8/1987 | Sidhu et al. | 370/92 |
| 4,709,365 | 11/1987 | Beale et al. | 371/11.2 |
| 4,718,005 | 1/1988 | Feigenbaum et al. | 364/200 |
| 4,825,204 | 4/1989 | Nakamura | 340/825.52 |
| 4,881,074 | 11/1989 | Reichbauer et al. | 340/825.05 |
| 4,984,233 | 1/1991 | Nakayashiki et al. | 370/16 |

FOREIGN PATENT DOCUMENTS

0290934 11/1988 European Pat. Off. .

OTHER PUBLICATIONS

Data Communications. vol. 18, No. 15, Nov. 1989, New York, USA, pp. 26-34, "Token ring compatibility: It's time to plug and play" Authors: Jim Carlo and John Hughes.
Computer Networks and ISDN Systems. vol. 11, No. 2, Feb. 1986, Amsterdam, Netherlands, pp. 121-131. "Reliability Mechanisms of the FDDI High Bandwidth Token Ring Protocol" Author: M. J. Johnson.
Ocheltree, Kenneth B., Jan. 23, 1989, "FDDI Duplicate Address Problems", International Business Machines, IBM, Research Report.
Ocheltree, Kenneth B., and Montalvo, Rafael M., Oct. 1989, IEEE 14th Conference on Local Computer Networks, in Minneapolis, MN, "FDDI Ring Management".
Yang, H., and Ramakrishnan, K. K., "Frame Content Independent Stripping for Token Ring", Proceedings of the ACM, SIGCOM 1990, Sep. 1990.

(List continued on next page.)

Primary Examiner—Donald J. Yusko
Assistant Examiner—Edwin C. Holloway, III
Attorney, Agent, or Firm—A. Sidney Johnston; Barry N. Young; Albert P. Cefalo

[57] ABSTRACT

An apparatus to detect stations having duplicated addresses, the stations of the type connected in a computer communications network, the stations of the type capable of having an assigned address and having a list of addresses for comparison with a destination address field of a frame detected on the network is disclosed. The apparatus does a transmit self test, and sets a self indicator to "pass" in the event that the self test frame is received, and sets the self indicator to "timeout" in the event that a timeout occurs. The apparatus does a neighbor response test, and sets a neighbor indicator to "timeout" in the event that a timeout occurs, and sets the neighbor indicator to "pass" in the event that a received response frame indicates no destination address match, and sets the neighbor indicator to "fail" in the event that a received response frame indicates that a destination address match did occur. The apparatus tests both the self indicator and the neighbor indicator, and in response to the testing of the self indicator and the testing of the neighbor indicator sets a duplicate address indicator in one of three states, a first state of the three states indicating that there is no duplicate address detected, a second state of the three states indicating that there is a duplicate address, and the third state of the three states indicating an unknown condition.

8 Claims, 9 Drawing Sheets

OTHER PUBLICATIONS

FDDI SMT—"Fiber Distributed Data Interface (FDDI)—Station Management", Sep. 5, 1989, Draft Proposed American National Standard, X3T9/89—, X3T9.5/84-49, Rev. 5.1, published by American National Standards Institute.

FDDI SMT—"Fiber Distributed Data Interface (FDDI)—Station Management", May 18, 1990, Preliminary Draft Proposed American National Standard, X3T9/90-078, X3T9.5/84-49, Rev. 6.2.

FDDI—MAC—"fiber distributed data interface (FDDI)—token ring media access control (MAC)", American National Standard 1987, published by American National Standards Institute, X3.139-1987.

Advanced Micro Devices, Feb. 1989, Specification sheet for chip Am79C83, Title: "Fiber Optic Ring Media Access Controller (FORMAC)" Publication No. 09731.

FDDI PHY—"fiber distributed data interface (FDDI)—token ring physical layer protocol (PHY)", American National Standard, 1988, Published by American National Standards Institute, ANSI X3.148-1988.

J. Winkler, et al.: "Standards and Architecture for Token-Ring Local Area Networks", 1986 Fall Joint Computer Conference, Nov. 1986, Dallas, U.S., pp. 479-488.

TESTING A COMMUNICATIONS NETWORK FOR DUPLICATE STATION ADDRESSES

This is a continuation of copending application Ser. No. 07/555,861 filed on Jul. 19, 1990, now abandoned.

FIELD OF THE INVENTION

This invention relates generally to computer networks for communication among a plurality of computers, and more particularly to testing the network for the presence of duplicate station address on the network.

BACKGROUND OF THE INVENTION

Each station on a computer communications network has a unique address, referred to as "my address", or MA. (Hereinafter quote marks "..." will be used to set off variable names, and in some instances, a value assigned to a variable in order to clarify the presentation. Also, in order to clarify the presentation, variable names, and sometimes their values are capitalized. Quote marks and capitalization are also used to set off compound nouns.) Also, many stations have a list of address for various purposes. In the event that two stations have the same address, the operation of the network may be destroyed through a failure mode. Also, if one station has an inappropriate entry in a list of the address of stations on the network, the operation of the network also may be destroyed through a failure mode. Failure modes are discussed more fully in the Appendix hereinbelow, and also some of the specific failure modes possible in the Fiber Distributed Data Interface, FDDI, type of communications token ring network are disclosed in the Appendix.

As an example, the "Ringop/Claim Oscillation" failure mode occurs in systems using source address stripping, and may paralyze the communications system. In order to describe the Ringop/Claim Oscillation failure mode several points must be made: 1, a station strips its own frames from a logical ring communications system by comparing the source address field of the frame with its own station address; 2, a station having an address duplicating the address of the transmitting station inappropriately strips from the ring the frames created by the transmitting station; 3, stations lying between the duplicate address station and the transmitting station will receive no frames for the time period that the transmitting station transmits; 4, each station has a timer, referred to as the TVX timer, which causes the station to reinitalize the ring in the event that the station does not receive frames or tokens within the timing interval of the TVX timer; 5, in the event that the transmitting station transmits frames for a time period exceeding the timing interval of the TVX timer, the downstream stations from the duplicate address station will timeout their TVX timers and consequently reinitalize the communications ring. That is, the ring will unexpectedly be reinitalized as a result of source address stripping by a duplicate address station.

A number of tests have been devised to test a computer network for the presence of duplicate station addresses. One such test used in ring configured communications networks is the "Transmit Self Test", and consists of having a station transmit a frame to itself. This test relies on the fact that the ring uses source address stripping to strip frames from the ring. If the frame circumnavigates the ring, then the ring passes the test, and it is assumed that no address duplicating the station's address exists on the ring. If a duplicate address did exist on the ring, it is assumed that the station having the duplicate address would have stripped the frame from the ring because the ring uses source address stripping. However, there are several conditions where this test can give either a missed detection of a duplicate address existing on the ring, or a false alarm that there is a duplicate address. For example, if one station on the ring is broken and simply does not repeat frames correctly the test will fail, and thereby give a false alarm of the existence of a duplicate address of the transmitting station. Also, there is no positive indication of a duplicate address, only a timeout condition of the station transmitting a frame to itself.

A second test used for testing a communications ring for a duplicate address involves two stations, and is called the "Neighbor Response Test". In the Neighbor Response Test an initiating station transmits an inquiry frame with the broadcast destination address and its own address as the source address of the frame. The first station to receive the inquiry frame then transmits a response frame. The response frame has its destination address field containing the address of the initiating station. The first station to receive the inquiry frame is the downstream nearest neighbor of the initiating station. The response frame is then detected and repeated by each intervening station until the response frame reaches the initiating station. The test is based on the fact that as a station detects and repeats a frame, it checks the destination address of the frame against a list of addresses held within the station for frame reception decisions. When the response frame reaches the initiating station, the initiating station checks the indicator bit in order to determine if the indicator bit shows that the initiating station's address was detected in any of the repeating stations. In the event that the indicator bit is "set" when the response frame is received by the initiating station, the ring network fails the test, and it is assumed that the initiating station has its addresses duplicated in one of the repeating stations. However, there are several conditions where the Neighbor Response test can give a false alarm indicating the presence of a duplicate address when there is none, and can also give a missed detection indication that there is no duplicate address of the initiating station on the ring when there is one. A missed detection indication that the ring is clear of duplicate addresses is given by this test when the duplicate address is in a list in a station, where the list is used to source frames such as in a bridge forwarding list, because the destination address of the frame is not tested against such a list; stated succinctly, the initiating station's address is not in the "receive destination address set", also referred to as the "receive DA set", but is used by the duplicate station to strip. A false alarm indication that there is a duplicate address is given by this test in the event that the source address of the frame is in a receive destination address set in the station, but the station does not use this list to transmit frames onto the ring.

No satisfactory test for the presence of duplicate addresses on a ring communications network for computers is available to overcome the false indications that the present tests give.

SUMMARY OF THE INVENTION

An apparatus to detect stations having duplicate addresses, the stations of the type connected in a computer communications network, the stations of the type capable of having an assigned address and having a list of addresses for comparison with a destination address field of a frame detected on the network, comprising:

means for doing a transmit self test, and for setting a self indicator to pass in the event that the frame is received, and for setting the self indicator to timeout in the event that a timeout occurs;

means for doing a Neighbor Response Test, and for setting a neighbor indicator to timeout in the event that a timeout occurs, and for setting the neighbor indicator to pass in the event that a received response frame indicates no destination address match, and for setting the neighbor indicator to fail in the event that a received response frame indicates that a destination address match occurred;

means for testing both the self indicator and for testing the neighbor indicator, and in response to the testing of the self indicator and the testing of the neighbor indicator for setting a duplicate address indicator in one of three states, a first state of the three states indicating that there is no duplicate address detected, a second state of the three states indicating that there is a duplicate address, and the third state of the three states indicating an unknown condition.

Testing of the neighbor indicator and the self indicator proceeds by the duplicate address indicator being set into a one of the three states in accordance with the following table,

| Condition | Neighbor Indicator | Self Indicator | Duplicate Address Indicator |
|---|---|---|---|
| 1. | timeout | timeout | unknown |
| 2. | timeout | pass | pass |
| 3. | pass | timeout | unknown |
| 4. | pass | pass | pass |
| 5. | fail | timeout | fail |
| 6. | fail | pass | pass | the duplicate address indicator indicating no duplicate address detected by the pass condition, and indicating a duplicate address detected by the fail condition, and indicating that the test is inconclusive by the unknown condition.

The Neighbor Indicator and the Self Indicator may be set to an "unknown" condition upon the event power of up of the apparatus.

Other and further aspects of the present invention will become apparent during the course of the following description and by reference to the accompanying drawings.

BRIEF DESCRIPTION OF THE DRAWINGS

Turning now to the drawings, in which like numerals represent like parts in the several views.

DETAILED DESCRIPTION

Figure 1:
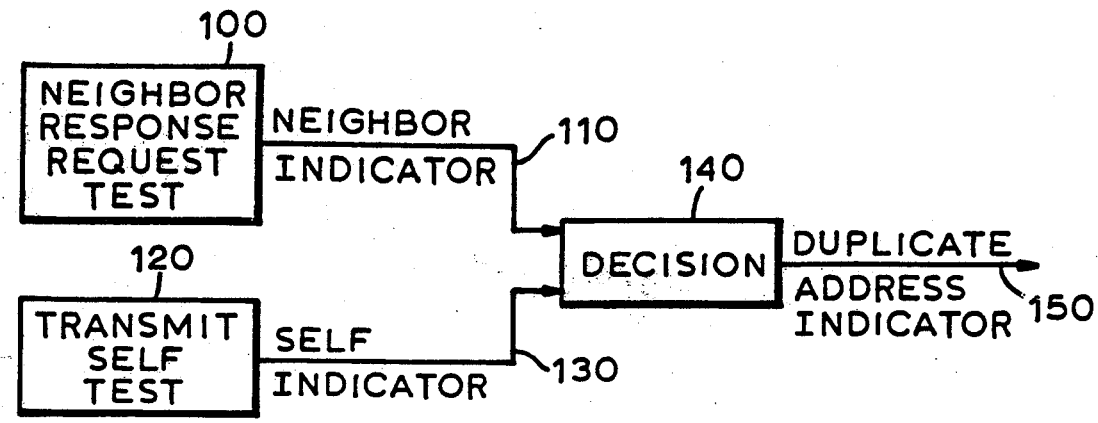
FIG. 1 is a block diagram of an apparatus for testing a communications ring for the presence of duplicate station addresses in accordance with the invention.

Referring now to FIG. 1, a Neighbor Response Test is done in block 100. The output of the Neighbor Response Test is a variable, referred to as the "neighbor indicator", and is placed on line 110 by block 100. The "neighbor indicator" has four states, and is set to one of these states depending upon the outcome of the Neighbor Response Test. The four states of the "neighbor indicator" are: pass, indicating that the test did not detect the presence of a duplicate station address on the communications network; fail, indicating that a duplicate station address was detected; timeout, indicating that no response frame was received during a timeout period, where the timeout period is referred to as the "neighbor response request time", NRR time; and unknown, the value to which the indicator is initialized at power up.

A transmit self test is done at block 120. The output of the transmit self test is a variable, referred to as the "self indicator", and is placed on line 130 by block 120. The "self indicator" has three states depending upon the outcome of the transmit self test. The three states of the "self indicator" are: pass, indicating that the transmitted frame was received by the station originating it; timeout, indicating that that no frame was received during a timeout period, where the timeout period is referred to as "transmit self test time", TST time; and, unknown, the state to which the indicator is initialized at power up.

Decision block 140 receives as input both the "neighbor indicator" on line 110 and the "self indicator" on line 130. Decision block 140 performs a logical process on the "neighbor indicator" and the "self indicator", and as a result of the logical process generates an output on line 150. The output on line 150 is a variable referred to as the "duplicate address indicator". The "duplicate address indicator" has three states referred to as: pass, indicating that a duplicate address was not found; fail, indicating that a duplicate address probably exists in the network; and, unknown, indicating that the results of the tests is not conclusive concerning the presence or absence of a duplicate station address on the network.

More details of the Neighbor Response Test and of the transmit self test will be disclosed hereinbelow.

Referring now to FIG. 2, there are shown fields of a typical frame 158 that are used by the present invention.

The fields shown in FIG. 2 are consistent with the FDDI MAC standard as disclosed more fully hereinbelow, and also are consistent with the IEEE 802.5 Token Ring Local Area Network standard.

Hereinafter, a reference to a station receiving a frame means that the cyclic redundancy check, CRC, performed on the frame gave a "good frame" indication, that is there was no frame check sequence error.

FC field 160 is the frame control field and contains a sequence of bits giving the receiving station information as to the type of frame that frame 158 is. For example, FC may indicate that frame 158 is a data frame, or a beacon frame, or a claim frame, or a control frame, or some other type of frame.

Each station is assigned a unique "my address" for the purpose of identifying the station. Further details of the "my address" are disclosed in the Appendix hereinbelow.

DA field 162 is the destination address of frame 158, and indicates the "my address" of the station to which the frame 158 is being sent, or may be a multicast address to indicate the plurality of stations to which frame 158 is being sent, or may be a broadcast address to indicate that all stations are intended to receive frame 158.

In a ring communications network, stations detect all frames 158 that arrive, stations repeat all detected frames 158 onto the ring network unless inhibited by a process, and all stations test the DA address field of a detected frame 158 in order to decide if the station should receive the frame 158 by passing the frame 158 from the MAC sub layer to higher layers of the transmission protocol.

SA field 164 is the source address field of frame 158, and indicates the "my address" of the station originating frame 158. In networks using source address stripping, all stations test the SA field 164 in order to decide whether or not the station should repeat frame 158 on the network. In the event that the receiving station's "my address" matches the address of the SA field 164 of a detected frame 158, then frame 158 is removed from the ring network by the station inhibiting the repeat of frame 158 onto the network.

FS field 166 is the frame 158 status field. Among the functions of FS field 166 are, for example: FS field 166 contains an indicator, referred to hereinafter as the A indicator. The values of the A indicator can be one of: "set", "reset", or "unavailable". "Unavailable" means that the A indicator was not detected by a station as either a "set" or "reset" condition, for example, as a result of noise corruption. The A indicator is capable of informing the originating station, after the frame 158 circumnavigates the ring network and is detected by the originating station, whether or not any station detecting the frame 158 received frame 158.

Operation of the A indicator is as follows: when the frame 158 is initiated by being transmitted by the originating station, the A indicator is set to a "reset" condition; any detecting station that finds a match between the DA field 162 of frame 158 and an address held in the receive destination address set in the detecting station, where the list includes broadcast addresses, multicast address, "my address" of the detecting station, or other address for the purpose of receiving frames, the detecting station indicates that a match occurred by changing the state of the A indicator to a "set" state. Any detecting station finding the A indicator in the "set" state does not change the state of the A indicator. Accordingly, the state of the A indicator shows whether or not any station received frame 158, and this information is available to the originating station after the frame 158 circumnavigates the ring.

However, the A indicator in the "unavailable" state provides no information about the destination addresses match, and indicates that an error probably occurred, such as for example, a noise corruption error.

Stated differently, all stations detect frame 158, only those having the DA field 162 match with an address in the station, receive frame 158. And the state of the A indicator in field FS 166 indicates whether or not any station received frame 158.

Figure 2A:
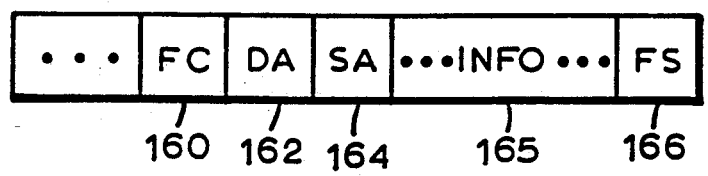
FIG. 2A is a drawing of frame format for a frame transmitted in a communications network in accordance with the invention.
Figure 2B:
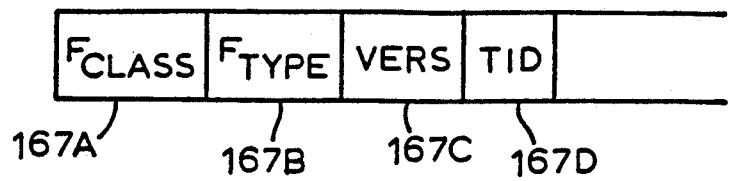
FIG. 2B is a drawing of selected frame fields, in accordance with the invention.

Fields of frames used in the Neighbor Response Test and in the Transmit Self Test are shown in FIG. 2A and FIG. 2B. The fields 165 as shown in FIG. 2A are shown in more detail in FIG. 2B. Field 167A is the frame class and field 167B is the frame type. As an example of these fields, the ANSI/FDDI SMT standard, referenced hereinbelow, uses the following hexadecimal representations. Field 167C is reserved for a version number of the implementation. Field 167D is a transaction identifier, Tid.

The field values for a Transmit Self Test frame, referred to as a TS_TEST frame, are:

| Frame Control Field FC 160 | 4F hexadecimal |
| Frame Class 167A | 01 hexadecimal |
| Frame Type 167B | 01 hexadecimal. |

The ANSI/FDDI SMT standard does not specify the TS_TEST frame format. As an example, the ANSI/FDDI SMT standard Neighbor Information Announcement frame may be used for the TS_TEST frame.

The field values for the Neighbor Response Test are, for the inquiry Frame, referred to as the NRR_TEST frame:

| Frame Control Field FC 160 | 4F hexadecimal |
| Frame Class 167A | 01 hexadecimal |
| Frame Type 167B | 02 hexadecimal | and for the response frame, referred to as the NRR_TEST_RESPONSE frame:

| Frame Control Field FC 160 | 41 hexadecimal |
| Frame Class 167A | 01 hexadecimal |
| Frame Type 167B | 03 hexadecimal. |

Figure 3A:
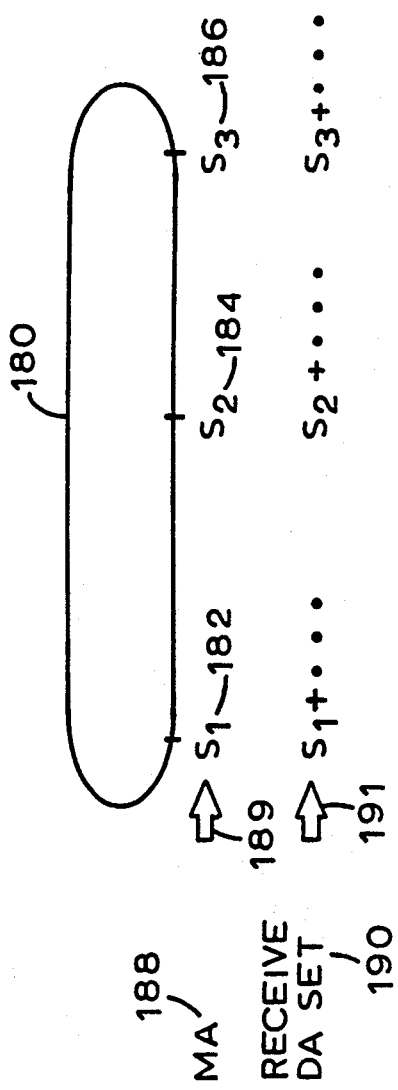
FIG. 3A is a logical topology of a ring communications network in accordance with the invention.

Referring now to FIG. 3A, there is shown a ring communications network 180. Network 180 has by way of example, three stations, station S1 182, station S2 184, and station S3 186. MA label 188, along with double arrow 189, indicates that the "my address" of the stations are in the row to the right of arrow 189, and further indicates that: the "my address" of station S1 182 is S1; the "my address" of station S2 184 is S2; and the "my address" of station S3 186 is S3.

The "receive destination address set", (receive DA set), label 190 along with double arrow 191 indicates the set of addresses used by the stations for the purpose of destination address matching. Station S1 182 is indicated to have in its receive DA set the addresses: S1, and others indicated by the symbol . . . ; station S2 184 has in its receive DA set the addresses S2, and others indicated by the symbol . . . ; and station S3 186 has in its receive DA set the addresses S3, and others indicated by the symbol . . . .

Figure 3B:
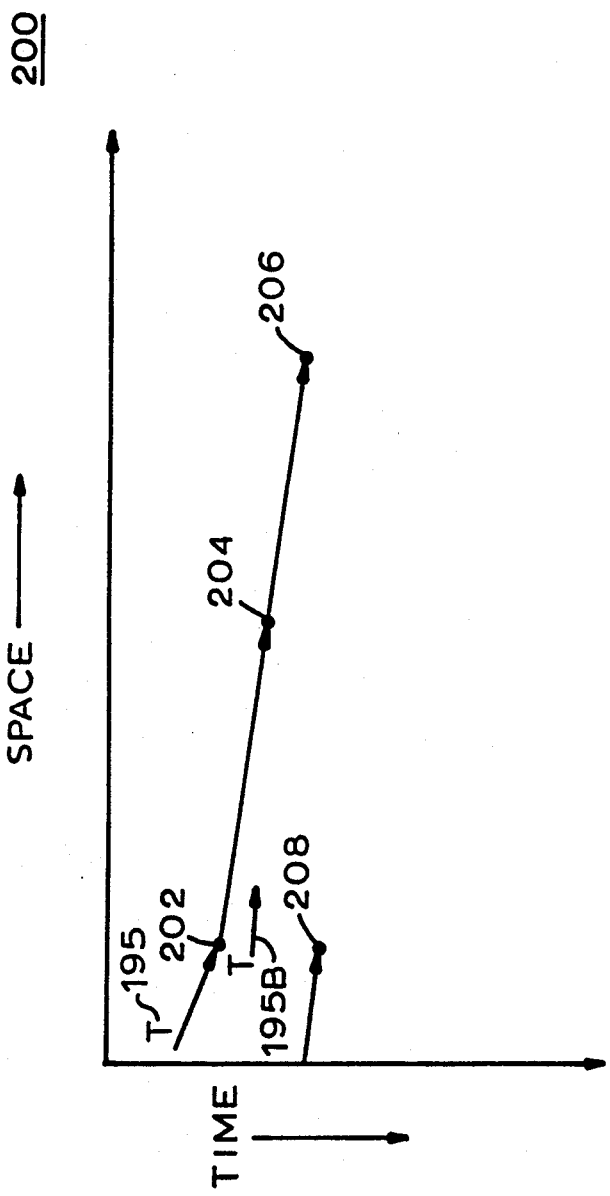
FIG. 3B is a space-time drawing for the network of FIG. 3A.

Referring to FIG. 3B, there is shown a space-time diagram 200 with which a frame traveling on the communications network 180 may be traced. Station S1 182 receives a token 195, thereby enabling station S1 182 to transmit. A frame is initiated by station S1 182 at location 202, and the frame is sent to station S2 by having the destination address DA field 162 of the frame containing the value of S2, that is DA=S2. Also the source address field SA field 164 of the frame contains the value of S1, that is SA=S1, indicating that the frame was originated by station S1 182. After finishing its transmission, station S1 182 transmits token 195B in order to enable downstream stations to transmit.

All locations, such as location 202, in the space-time diagram 200 depict both a spatial point on the communications network 180 along the horizontal axis, and the occurrence of an event in time along the vertical axis.

The frame is detected and repeated onto the ring communications network 180 by station S2 184 at location 204, and station S2 184 finds a match between its receive DA set 190 and the destination address field DA 162 of the frame. Accordingly, station S2 takes the following action: the frame is received by station S2 by being passed to higher layers of the communications protocol, and the A indicator in field FS 166 of the frame is set to the "set" state.

The frame is detected by station S3 186 at location 206. Station S3 repeats the frame on the communications network 180 without changing any field of the frame. Station S3 takes no further action because there is no match between either destination address DA field 162 or source address SA field 164 of the frame and any address in station S3 186.

The frame then returns to the originating station S1 182 at location 208, where station S1 finds a match between the SA field 164 with the "my address" of Station S1 182. Accordingly, repeating of the frame is inhibited, and so the frame is stripped from communications network 180 by station S1 at location 208.

The A indicator in the FS field 166 of the frame provides information which is available to a station, including the originating station of the frame. The information available by receiving and testing the A indicator in the FS field 166 of the frame is that a station, including the originating station S1 182, can learn that at least one station received the frame. In the event, not shown, that more than one station received the frame, the A indicator would simply have the "set" condition indicating that at least one station received the frame.

Figure 4A:
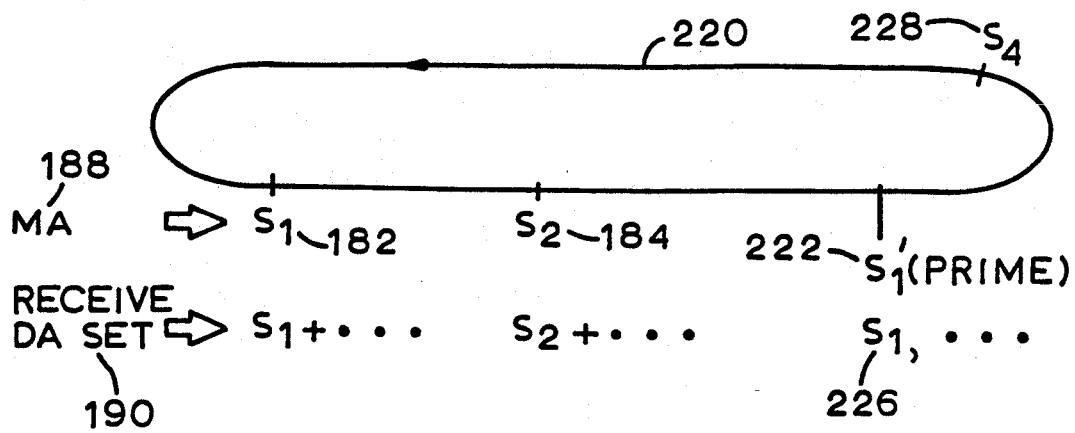
FIG. 4A is a ring communications network in accordance with the invention.

Referring to FIG. 4A, there is shown a ring communications network 220. Again MA label 188 shows the "my address" values for the stations. Station S1 182 and station S2 184 are the same as in the communications network 180 shown in FIG. 3A. However, a fault exists on the communications ring 220, in that station S1(prime) 222 has a duplicate address equal to the address of station S1 182. Also station S1(prime) 222 has its "my address" S1 in its "receive DA set" 190, as shown by item 226 in the "receive DA set".

Figure 4B:
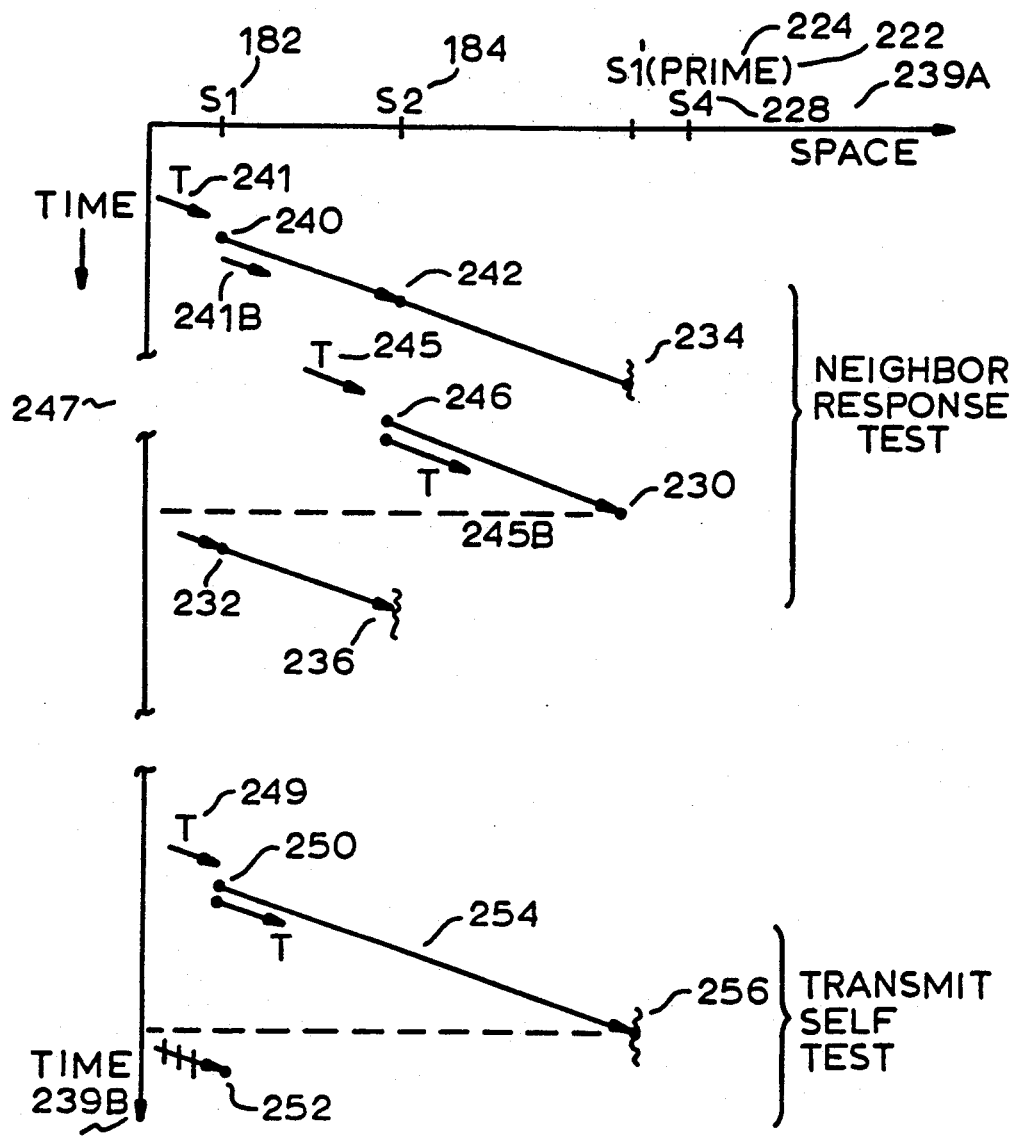
FIG. 4B is a space-time drawing for the network of FIG. 4A.

Referring to FIG. 4B, the frame with SA field 164 containing a value of S1, that is SA=S1, will now be stripped by station S1(prime) 222 as the frame reaches location 234. Consequently stations downstream from station S1(prime), for example station S4 228, will not receive frames from station S1 182 because station S1(prime) 222 strips them from the ring communications network 220 before the frames reach station S4 228.

As a result of this duplicate address situation existing in station S1(prime) 222, and in the event that station S1 transmits frames for a length of time exceeding a time-out period referred to as a TVX time period, then station S4 228 will time out because it detects no frames. When station S4 times out it causes the ring to enter a recovery and initialization cycle by causing a beacon or claim process to begin. This fault condition is referred to as a Ringop/Claim oscillation.

Referring now to FIG. 4B, there is shown a space-time diagram for station S1 182 both performing a Neighbor Response Test and performing a transmit self test. The locations of the stations are shown along the horizontal space axis 239A. The time axis 239B is shown as a vertical line.

The Neighbor Response Test begins at location 240. First, station S1 182 receives a token 241 enabling the station to transmit. Then station S1 182, at location 240, transmits an inquiry frame onto the ring communications network 220. The fields of the inquiry frame, using the general frame 158 as a guide, are set as follows: FC field 160 is set to indicate that the frame is an inquiry frame; DA field 162 is set to a broadcast address so that all stations will receive the frame no matter what the address of the detecting station is; SA field 164 is set to S1 indicating that station S1 182 originated the frame; and FS field 166 has its A indicator set to "reset" indicating that the frame has not yet been received.

After originating the inquiry frame at location 240, station S1 182 transmits token 241B onto the ring in order enable downstream stations to have their turn to transmit.

At location 242, station S2 184, the nearest downstream neighbor station to station S1 182, detects the inquiry frame. At location 242 station S2 184 learns from FC field 160 that the frame is an inquiry frame, and from FS field 166 station S2 184 learns that it is the first station to detect the inquiry frame. While receiving and repeating the inquiry frame station S2 184 changes the A indicator of FS field 166 to indicate the "set" condition, thereby preventing subsequent stations which detect the inquiry frame from sourcing a response frame. The inquiry frame initiated by station S1 182 at location 240 will be stripped by station S1(prime) 222 at location 234, as a result of the duplicate address fault.

Later, at location 246 and after receiving token 245, station S2 184 transmits a response frame having the fields set as follows: FC field 160 indicating that the frame is a response frame, responding to the inquiry frame detected at location 242; DA field 162 set to the address of station S1 182 because it was station S1 182 that originated the inquiry frame; SA field 164 set to the address of station S2 184 indicating that station S2 184 originated the response frame, and also would normally indicate to station S1 182 when the frame is detected by station S1 182 that station S2 184 is the nearest downstream neighbor to station S1 182; the A indicator of field FS 166 to "reset". The time delay between the event of station S2 184 receiving the inquiry frame at location 242 and the transmission of the response frame at location 246 is indeterminate, and depends upon, for example, reciept by station S2 184 of a token 245. Since station S2 184 must respond to the inquiry frame and adjust its internal state accordingly, station S2 184 may have to pass up several tokens before it is ready to transmit at location 246. This indeterminate wait is shown by broken lines 247 on the time axis 239B.

After originating the response frame at location 246, station S2 184 transmits token 245B onto the ring in order enable downstream stations to have their turn to transmit.

In the event that there is no station having a duplicate address to that of station S1 182, the response frame will arrive at station S1 182 having field FS 166 set to "reset", and this "reset" condition will result in the ring communications network 220 passing the neighbor inquiry test for duplicate station addresses.

However, in the ring communications network 220 shown in FIG. 4A at location 230, station S1(prime) 222 will find a match between the destination address field DA field 162 of the response frame and the "receive DA list" entries in station S1(prime), and will therefore set the A indicator in field FS 166 to the "set" condition. Consequently, when the frame arrives at location 232 at station S1 182, station S1 182 will detect the "set" condition of the A indicator in FS field 166, and will set an indicator that the Neighbor Response Test for duplicate addresses located a duplicate address, that is the ring communications network failed the test. The "neighbor indicator" on line 110 of FIG. 1 will be set to fail.

The response frame will be stripped by station S2 184 at location 236, since station S2 184 originated the response frame.

Accordingly, the Neighbor Response Test for a duplicate address was successful in that it located the duplicate address at station S1(prime) 222.

The Transmit Self Test will now be described. In initiating a transmit self test, after receipt of token 249 station S1 originates a transmit self test frame addressed to itself at location 250 shown in FIG. 4B. The fields of the transmit self test frame are set as follows: FC field 160 indicates that it is an transmit self test frame; destination address field DA 162 has the address of S1 182 entered, DA=S1; source address field SA is also set to the address of S1 182, SA=S1. In the event that the transmit self test frame circumnavigates the ring communications network and arrives back at station S1 182 at location 252 after following path 254 the ring communications network 220 would pass the transmit self test. However the ring communications network 220 will fail the transmit self test because the duplicate address entry of station S1(prime) will cause the transmit self test frame to be stripped at location 256. That is, the transmit self test frame will never reach location 252, and station S1 182 will fail the test as it does not receive the transmit self frame within a "transmit self test time". Expiration of the self timer indicates that the transmit self test frame did not successfully circumnavigate the ring communications network 220. The "self indicator" on line 130 of FIG. 1 will be set to timeout.

Referring now to FIG. 3A, the ring communications network 180 will pass the transmit self test because there is no duplicate "my address" entry in any station, and so the "self indicator" on line 130 of FIG. 1 will be set to pass.

Figure 5:
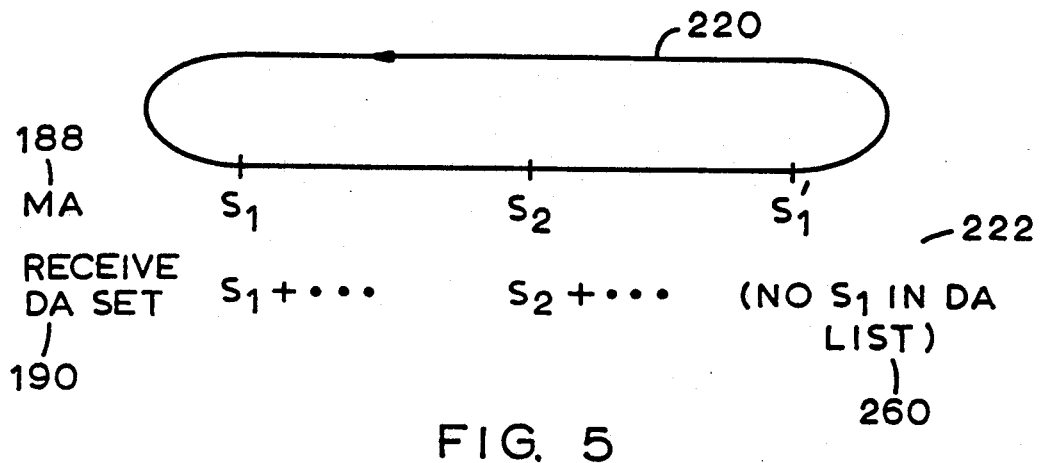
FIG. 5 is a ring communications network in accordance with the invention.

Referring now to FIG. 5, the Neighbor Response Test will fail to detect the presence of the duplicate station S1 address. This failure occurs because the "receive DA set" 190 for station S1(prime), indicated by reference numeral 260, specifically excludes the "my address" of station S1(prime) 222. Accordingly, the A indicator of the FS field of the response field will remain "reset" as station S1(prime) 222 repeats the inquiry frame because there will be no match between the destination address of the test frame and the receive DA set in station S1(prime) 222. The neighbor indicator on line 110 of FIG. 1 will be set to pass.

The situation shown in FIG. 5 is the "failure to detect" failure mode, and results from a duplicate station not having its "my address" in its receive DA set, the "receive DA set" 190. The absence of a station's "my address" from the receive DA set may result from a variety of conditions, including a hardware failure in the station. In the event that the absence is due to a hardware failure, the absence is an example of a station failure having a negative impact on communications ring operation.

Continuing to refer to FIG. 5, the transmit self test will detect the duplicate address because station S1(prime) will perform source address stripping based on its "my address". Accordingly, the self indicator will be set to "timeout".

Figure 6:
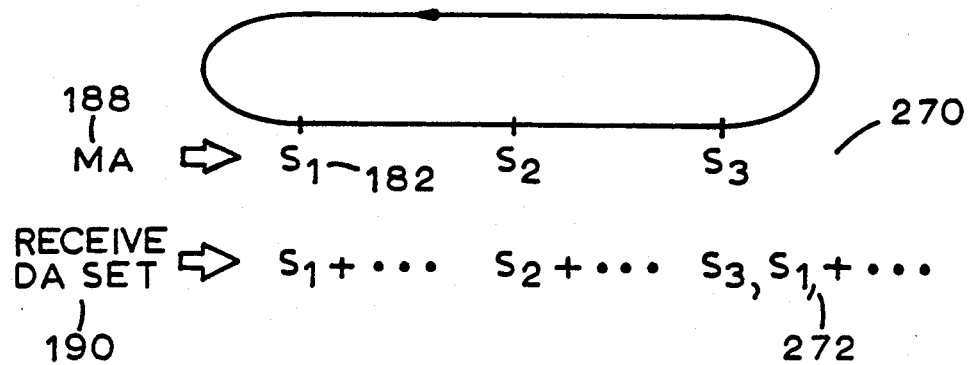
FIG. 6 is a ring communications network in accordance with the invention.

Referring now to FIG. 6, station S3 270 has a unique entry in its MA entries, where the entry is the address S3. However, the "receive DA set" 190 in its receive DA set 272 includes the address of station S1 182. Accordingly, station S3 will cause a failure of the Neighbor Response Test because the FS field 166 will be set to the "set" condition as the response frame is repeated by station S3 270. This failure of the test is a false indication, or a false alarm, because the duplicate address is not in the "my address" entry of the station S3 270.

Continuing to refer to FIG. 6, the transmit self test will pass at station S3 270, because the test frame will not be stripped by source address stripping by station S3 270.

In accordance with the invention as shown in FIG. 1, the results of the Neighbor Response Test and the results of the transmit self test are combined to produce a variable referred to as the "duplicate address test" on line 150. The combination may, for example, be accomplished by having both tests run concurrently on the ring communications network 220.

The "duplicate address test" variable has three possible values: pass indicating that no duplicate address was found; fail indicating that a duplicate address was found; and unknown indicating that the results of the test are inconclusive. The values of the variable "duplicate address test" are assigned as a result of the values assigned to the "neighbor indicator" of line 110 in FIG. 1 and the "self indicator" of line 130 in FIG. 1, in accordance with the following Assignment Table, Table 1:

TABLE 1

| | ASSIGNMENT TABLE | | |
|---|---|---|---|
| Condition | Neighbor Indicator | Self Indicator | Duplicate Address Indicator |
| 1. | unknown or timeout | unknown or timeout | unknown |
| 2. | unknown or timeout | pass | pass |
| 3. | pass | unknown or timeout | unknown |
| 4. | pass | pass | pass |
| 5. | fail | unknown or timeout | fail |
| 6. | fail | pass | pass |

Accordingly the duplicate "address indicator" indicates that no duplicate address was detected by the pass condition, indicates that a duplicate address was detected by the fail condition, and indicates that the test is inconclusive by the unknown condition.

Referring again to FIG. 4B, the Neighbor Response Test and the Transmit Self Test may run concurrently on the ring communications network 220. For example, the Transmit Self Test could be initiated during the indeterminate waiting period 247. The Duplicate Address Indicator always uses the latest value of the Neighbor Indicator and of the Self Indicator.

Figure 7A:
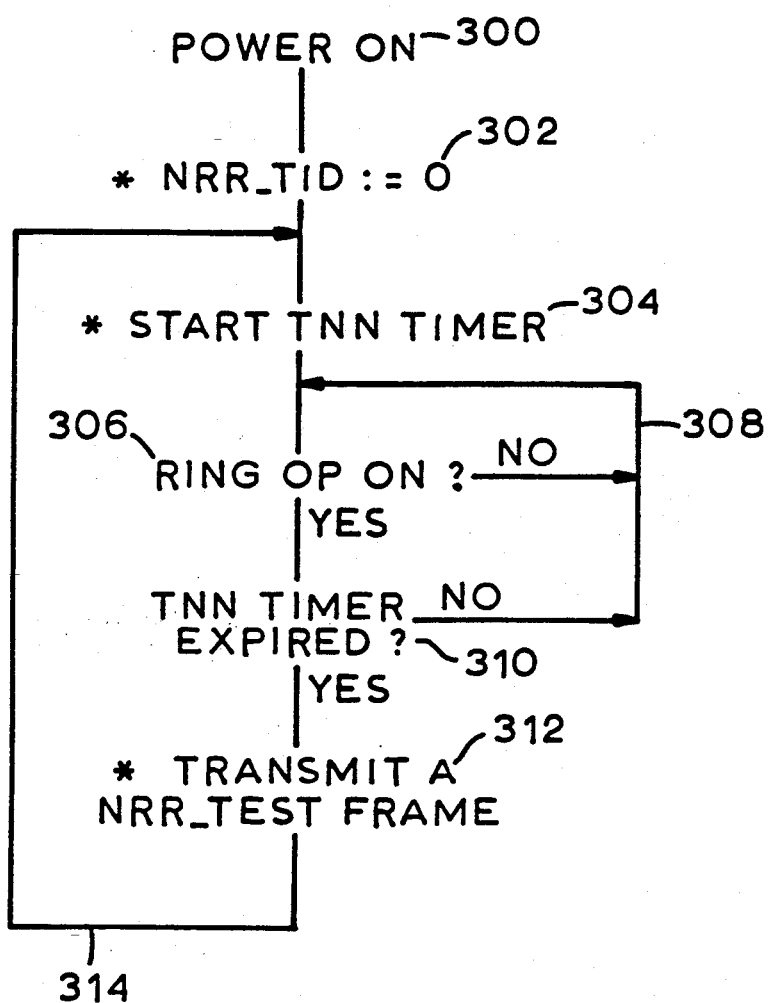
FIG. 7A is a transmitter process protocol diagram for a Neighbor Response test in accordance with the invention.
Figure 7B:
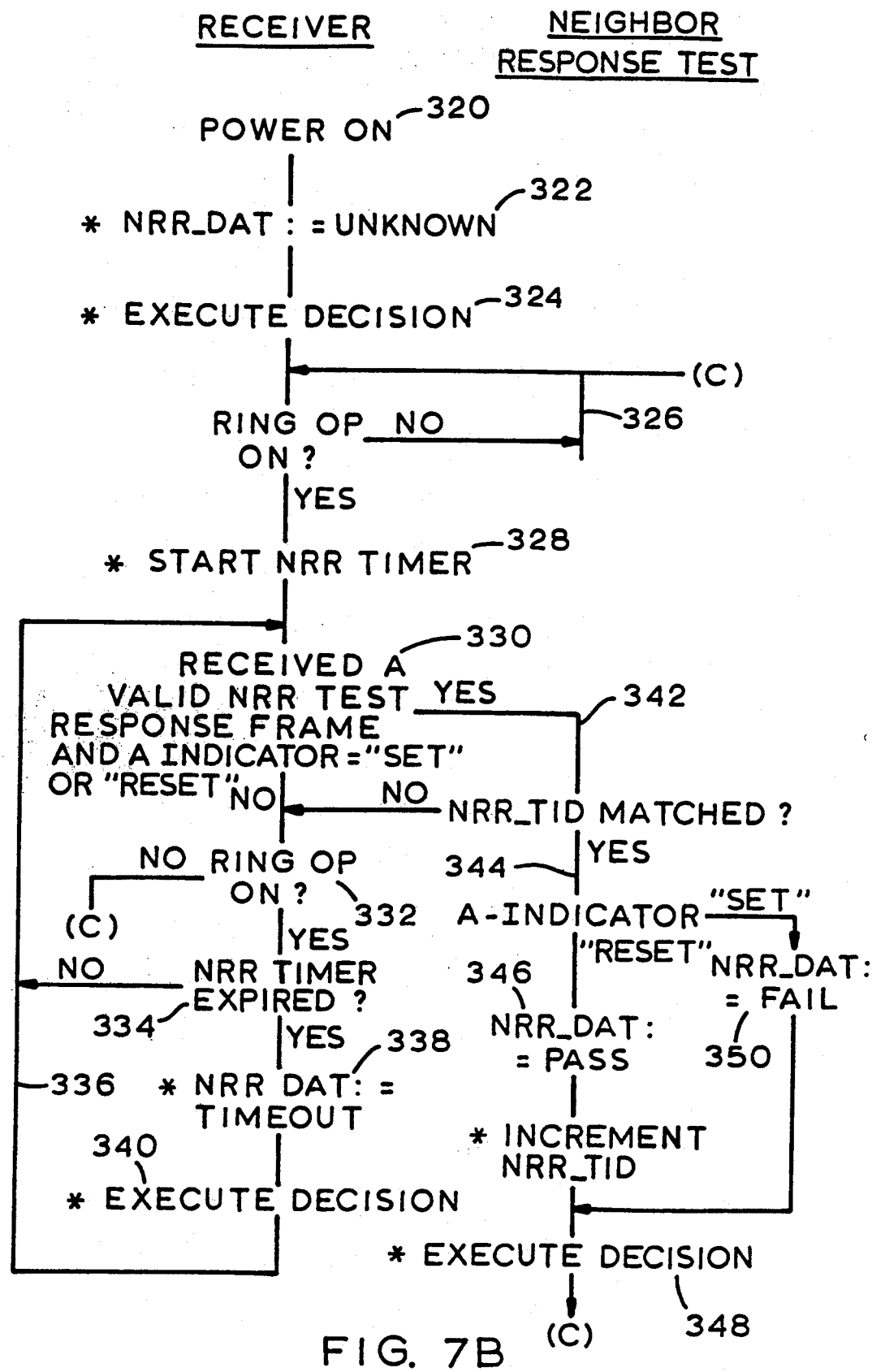
FIG. 7B is a receiver process protocol diagram for a Neighbor Response test in accordance with the invention.

Referring now to FIG. 7A, there is shown a flow diagram for a transmitter process in a station conducting a Neighbor Response Test, and there is shown in FIG. 7B a flow diagram for a receiver process in the same station. The transmitter and receiver process are modeled as concurrent cooperating processes.

For FIGS. 7A, 7B, 8A, and 8B, the timers are modeled as follows. A timer begins to operate when a start timer action is executed. A timer expires when a specified value of time has elapsed since the timer was started. Once the timer expires the timer stops in an "expired" state. For example, a timer may have a specified value of 30 seconds. After an elapsed time of 30 seconds since the timer was started, the timer expires and stops in an "expired" state.

Referring now to FIG. 7A, at point 300 the process is entered by the station during the power up cycle. The first action taken by the process at point 302 is to set an identification variable NRR_Tid to zero, the NRR_Tid variable supplies an identification to the test attempt.

The next action, taken at point 304, is to start a timer, referred to as the Neighbor Notification Timer, or TNN timer. For example, the TNN timer may have a value of 30 seconds.

The next action is to test the state of a variable held in the station referred to as Ring_Op. For example, a further discussion of the variable Ring_Op is given in the Appendix hereinbelow with reference to the FDDI MAC standard. If Ring_Op is "on", the ring is operational, however if Ring_Op is "off" the ring is not operational and is in a recovery or initialization process. In the event that Ring_Op is not "on", a test at point 306 returns along branch 308 in order to repeat the test at point 306.

The next action taken at point 310 is to test the TNN timer, and if the TNN timer has not expired to return along branch 308 to repeat the tests 306, 308.

In the event that the TNN timer has expired, the next action, at point 312, is to transmit a NRR_Test frame. The NRR_Test frame is the "inquiry" frame referred to hereinabove. After transmitting the NRR_Test frame, the process returns along branch 314 in order to repeat the cycle.

Referring now to the action of a downstream station (not shown) upon receiving the NRR_Test frame, the downstream station takes action depending upon the state of the A indicator of the frame. When a NRR_Test frame is received and the A indicator is "reset", the station responds with a "response frame" and also repeats the frame on the ring. When the NRR_Test frame is received and the A indicator is "set", the station simply repeats the frame on the ring. For example, the ANSI/FDDI SMT standard Rev. 6.2 dated May 18, 1990, at Section 7.2.1, and in particular at section 7.2.1.3, page 131, sets out the response of a station to a similar request referred to therein as a NIF request.

Referring now to FIG. 7B, the receiver process is entered at point 320 as part of the power up cycle. The first action, at point 322 is to assign to the variable NRR_DAT a value of "unknown" The NRR_DAT variable is the neighbor indicator on line 110 of FIG. 1.

The next action, at point 324, is to execute a DECISION process contained in box 140 of FIG. 1, and this DECISION process decides the outcome of the duplicate address indicator. The latest value of the "neighbor indicator" 110, that is variable NRR_DAT is used, as is the latest value of the "self indicator" on line 130 of FIG. 1.

The next action is to test the Ring_Op variable, and if it is not "on" to return along branch 326 to repeat the test of Ring_Op.

In the event that Ring_Op is on, the next action at point 328 is to start a NRR timer. The purpose of the NRR timer is to time the reception of the "response frame", and may be set to a value of, for example, 288 seconds.

The next action, at point 330, is to execute a test in order to determine if a valid NRR_Test_Response frame has been received. The NRR_Test_Response frame is the "response frame" referred to hereinabove. A valid NRR_TEST_Response frame means that all of the fields match the expected values. In the event that the result of the test is that no valid NRR_Test_Response frame has been received, the next action taken, at point 332 is to execute a test on the variable Ring_Op. In the event that Ring_Op is not "on", the process returns to point C on branch 326 in order to repeat the process.

In the event that Ring_Op is found "on" at point 332, the next action, at point 334, is to execute a test to determine if the NRR Timer started at point 328 has expired. In the event that NRR Timer has not expired, the process returns along branch 336 in order to repeat the test at point 330, where the process looks for the receipt of a valid NRR_TEST_Response frame.

In the event that at point 334 the NRR Timer has expired, the next action, at point 338, is to set the variable NRR_DAT to a value of "timeout". The next action, at point 340, is then to execute the DECISION process shown in block 140 of FIG. 1.

Referring again to the test at point 330 for a valid NRR_Test_Response frame, in the event that such a frame was received, the next action, at point 342, is to test that the variable NRR_Tid matches the received NNR_Test_Response frame transaction ID field (item 167D in FIG. 2B). This test insures that frames from one test cycle do not get mixed up with another test cycle. In the event that the test result is "no", the process branches to point 332, as it does when the test at point 330 does not detect a valid frame.

In the event that the test at point 342 is "yes" the NRR_Tid matches the value in the Tid field (item 167D in FIG. 2B), then the next action, at point 344 is to test the A indicator of the received response frame, NRR_Test_Response frame. In the event that the A indicator is clear, indicating that no station had a match between the frame destination address DA and an address in the station list of DA addresses, the next action, at point 346, is to set the variable NRR_DAT to a "pass" state. Then the next action, at point 348, is to execute the DECISION process of block 140 of FIG. 1.

In the event that the A indicator is in the "set" state, the action at point 350 is to set the NRR_DAT variable to a "fail" state, and then next to execute at point 348 the DECISION process of block 140 of FIG. 1. The next action taken following execution of the DECISION process at point 348, is the process returns to point C at branch 326 in order to repeat the test cycle.

Figure 8A:
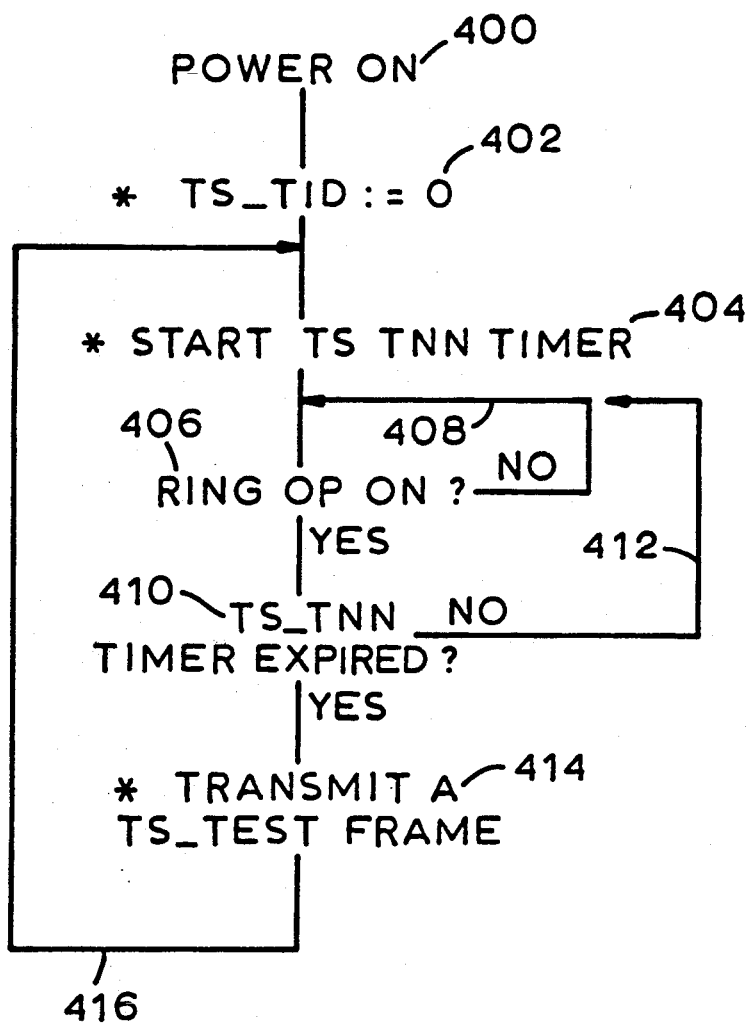
FIG. 8A is a transmitter process protocol diagram for a transmit self test in accordance with the invention.
Figure 8B:
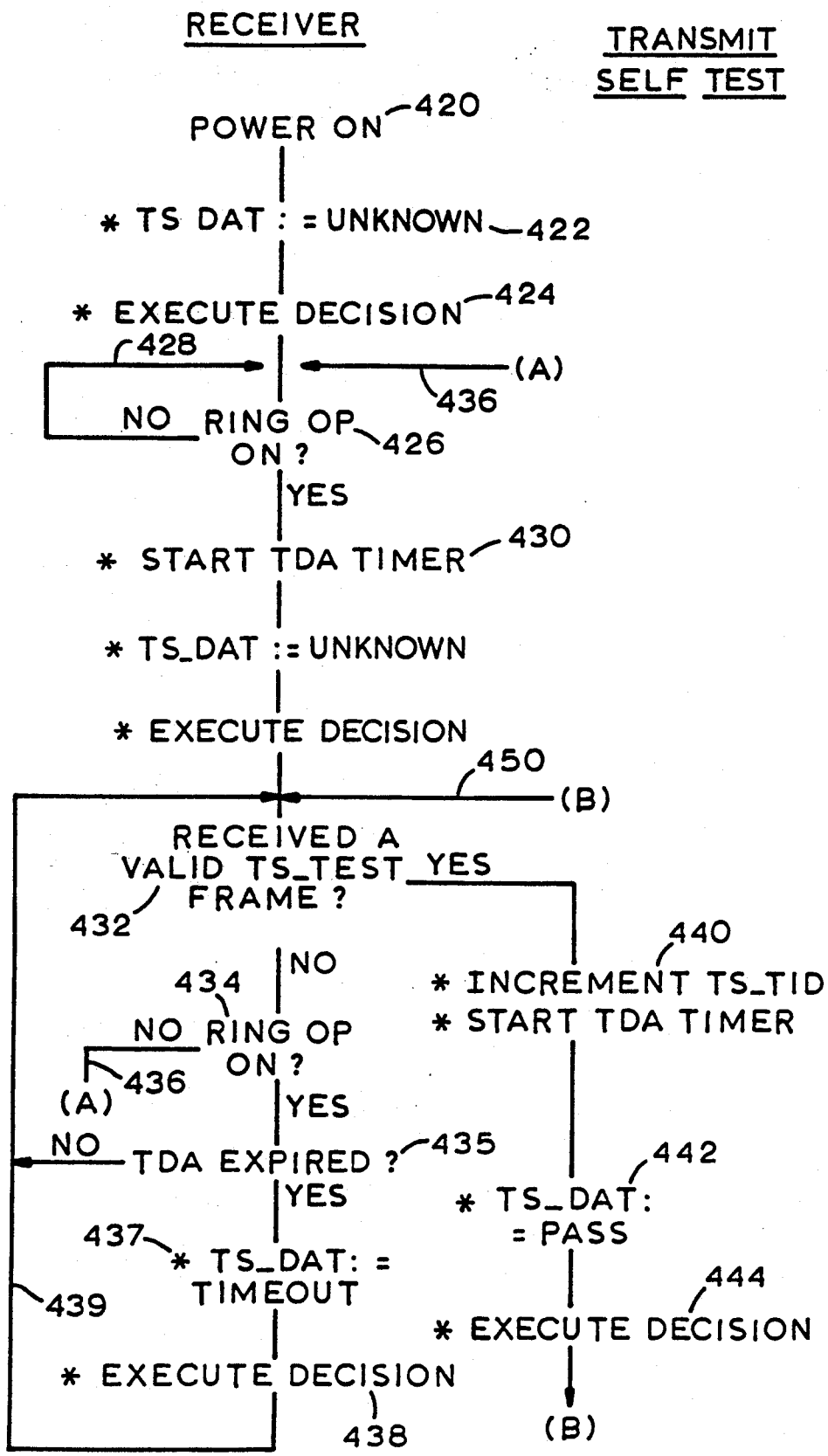
FIG. 8B is a receiver process protocol diagram for a transmit self test in accordance with the invention.
Figure 9:
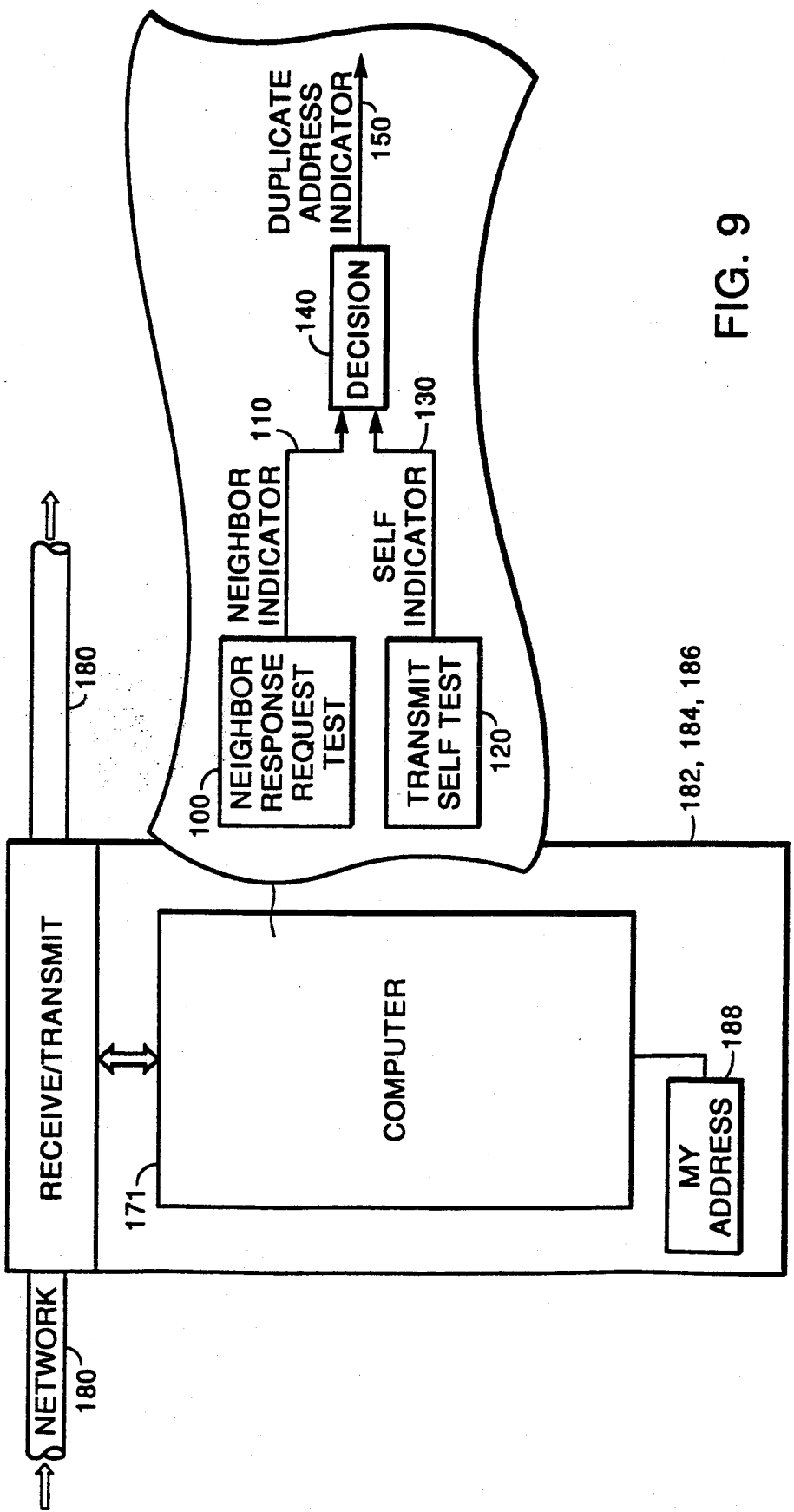
FIG. 9 is a block diagram of a station in a ring communications network with a duplicate address test apparatus in accordance with the invention.

Referring now to FIG. 8A, there is shown a flow diagram for a transmitter in a station conducting a transmit self test, and there is shown in FIG. 8B a flow diagram for a receiver in the same station. The transmitter and receiver process are modeled as concurrent cooperating processes.

At point 400, Power On, as part of the powering up procedure, the transmitter enters the Transmit Self Test process. At point 402, the first action is to zero a variable NRR_Tid. The purpose of the variable NRR_Tid is to assign a transaction identifier to the NRR_Test frame in order to provide identification for the frame and test cycle The next action, at point 404, is to start a timer referred to as the TS_TNN timer. The TS_TNN timer may have a value of, for example, 10 seconds.

The next action is to test the state of a variable held in the station referred to as Ring_Op. If Ring_Op is "on", the ring is operational, however if Ring_Op is "off" the ring is not operational and is in a recovery initialization process. In the event that Ring_Op is not "on", a test at point 406 returns along branch 408 in order to repeat the test at point 406.

In the event that Ring_Op is "on", the next action is to test the TNN timer at point 410. In the event that the TNN timer has not expired, the process returns along path 412 to repeat the tests at points 406 and 410.

In the event that the TS_TNN timer has expired, the transmitter transmits a Transmit Self Test frame at point 414. After transmitting the Transmit Self Test Frame, the process returns along branch 416, restarts the TNN timer at point 404, and begins the transmit cycle again.

Referring now to FIG. 8B, during the power on cycle of the station, the receiver process for the transmit self test is entered at point 420. The first action taken at point 422 is to set the variable TS_DAT to a value of "unknown". The variable TS_DAT is the "self indicator" of line 130 in FIG. 1.

The next action, at point 424 is to execute the DECISION process of block 140 of FIG. 1. The most recent values of the variables TS_DAT and NRR_DAT are used in the DECISION process.

The next action, at point 426, is to test the variable Ring_Op, and if it is not "on", the process returns along branch 428 in order to wait for the ring to become operational.

In the event that the ring is operational, the next action, at point 430, is: (1), to start a timer, referred to as the TDA timer; (2), set TS_DAT equal to "unknown"; (3), execute DECISION process. The TDA timer is the transmit self duplicate address timer, and may have a value of, for example, 90 seconds.

The next action taken, at point 432, is to execute a test in order to determine whether or not a valid TS_Test frame has been received, where the TS_Test frame was transmitted by the transmitter process at point 414 of FIG. 8A. A valid TS_Test frame means that all required fields match the expected values, where the required fields may include the transaction identifier.

In the event that no valid TS_Test frame was detected by the test at point 432, the next action taken, at point 434 is to test the variable Ring_Op, and in the event that it is "no", indicating that the ring is not operational, the process returns to point A on branch 436 in order to repeat the test cycle.

In the event that the ring is operational at the test of point 434, the next action at point 435 is to test the TDA timer. In the event that the TDA timer has not expired, the process returns on branch 439 to look for a valid TS_Test frame.

In the event that the TDA timer has expired, the test at point 435 goes to the next action, at point 437, to set the variable TS_DAT to the "timeout" state. Then the next action, at point 438, is to execute the DECISION process of block 140 of FIG. 1. After executing the DECISION process at point 438, the process returns along branch 439 in order to continue to look for a valid TS_Test frame.

Returning now to the test at point 432, in the event that a valid TS_Test frame was received and the test at point 432 answers "yes", the next action, is at at point 440. The action at point 440 is: to increment the TS_Tid identification variable initialized at point 402; and to re-start the TDA timer.

The next action, at point 442, is to set the variable TS_DAT to a "pass" condition. The next action, at point 444 is to execute the DECISION process of block 140 of FIG. 1.

After executing the DECISION process at point 444, the process returns to point B at branch 450 in order to begin the test cycle anew.

The major advantages or strength of the Transmit Self Test protocol is that in the absence of a duplicate address problem the test will complete quickly and there is positive indication that there is no duplicate address problem. With the use of a random number in the TS_Tid identification, the Transmit Self Test protocol has very low likelihood of having Missed Detection. The Transmit Self protocol can have False Alarm, and also one of its major weakness is the lack of positive indication when there is a duplicate address problem. For example, it cannot differentiate between a real duplicate address problem and a persistent loss of TS_Test frame transmitted at point 414 of FIG. 8A, because in both cases the Transmit Self protocol times out. However, when the Transmit Self protocol indicates that the test "passes", it is a reliable indication that there is no duplicate address problem.

On the other hand, the Neighbor Response Test protocol is prone to False Alarm and can have Missed Detection. In the absence of False Alarm, the Neighbor Response Test protocol does provide positive indication of duplicate address problems.

The Assignment Table, Table 1, is designed in such a way so that the strength of one protocol is used to complement the weakness of the other protocol. In this fashion, the overall outcome of the Duplicate Address Test is more reliable and robust. Refer to the Assignment Table, Table 1, for the following discussion.

1. Item 1 in the Assignment Table indicates lack of conclusive data so the Duplicate Address Indicator is set to Unknown.

2. Item 2 in the Assignment Table indicates that the "Neighbor Indicator" NRR_DAT is set to "timeout" but the "Self Indicator" is Pass. As indicated above, when the TS_DAT is Pass it is a reliable indication that there is no Duplicate Address problem. Therefore, the Duplicate address Indicator is set to Pass.

3. Item 3 in the Assignment Table indicates that the Neighbor Indicator is Pass and the Self Indicator is Timeout. The Self Indicator is more reliable. In order to err on the conservative side, the Duplicate Address Indicator is set to Unknown when there is a conflict between the NRR_DAT and TS_DAT.

4. Item 4 in the Assignment Table is straightforward as the two protocols are in agreement. Therefore, the Duplicate Address Indicator is set to Pass.

5. Item 5 in the Assignment Table indicates that both the Neighbor Indicator and the Self Indicator are in agreement. Therefore, the Duplicate Address Indicator is set to Fail.

6. Item 6 in the Decision Table indicates a major conflict between the two protocols, where the Neighbor Indicator indicates Fail and the Self Indicator indicates Pass. As indicated earlier, the strength of the Transmit Self Test protocol is that it is most reliable when its result is Pass. Also, the Neighbor Response Test protocol is prone to False Alarm. Therefore, the Duplicate address Indicator is set to Pass, despite the major conflict.

Based on the combination of the Neighbor Response Response Test and Transmit Self Test protocols and, most of all, the design of the Assignment Table, the new and improved Duplicate Address Test is more reliable, robust and deterministic than tests known previously.

The invention is an enhanced test for duplicate addresses during ring operation. In the FDDI context, the invention operates during Ring_Op equals true.

The FDDI/ANSI standard discloses a Neighbor Response Test and a Transmit Self Test in the document "FDDI Station Management (SMT)", X3T9/90-078, X3T9.5/84-49, Rev. 6.2, May 18, 1990, at page 153, and these tests apply during Ring_Op equals true.

Also a set of test criteria is discussed in the above referenced "FDDI Station Management (SMT)" document, at page 230, as applicable during ring recovery and initilization, that is during Ring_Op equals "false". And these criteria are discussed hereinbelow in the Appendix.

The Neighbor Response Test and the Transmit Self Test can operate concurrently. Concurrent operation is achieved by having processes, as shown in FIG. 7A, 7B and in FIG. 8A, 8B, operating at the same time, and operating from independent timers. The latest value of the results of the tests are then used in the DECISION process. In such concurrent operation, the age of the oldest Test indicator is then the age of the DECISION PROCESS RESULT.

Only one of the tests, the Neighbor Response Test or the Transmit Self Test can execute the DECISION process at one time. In the event that one test is operating the DECISION process at a time that the second test becomes ready to execute the DECISION process, the second test must simply wait until the DECISION process becomes free by completing the first call.

An apparatus to detect stations 182, 184, 186, having duplicate addresses, said stations of the type connected in a computer communications network, 180, 220, said stations of the type capable of having an assigned address, comprising: means for doing a neighbor repsonse test 100, 312, 330, 332, 338, 344, 346, 350; means for doing a transmit self test, 120, 402, 404, 406, 408, 410, 412, 414; means, 140, 340, 348, 438, 444, responsive to said neighbor response self test and responsive to said transmit self test, for setting a duplicate address indicator in one of three states, a first state of said three states indicating the there is no duplicate address detected, a second state of said three states indicating that there is a duplicate address, and a third state of said three states indicating an unknown condition.

APPENDIX

Computer Networks

A network of computers 171 using a common medium for exchange of frames between stations of the network must have some means for deciding which station 182, 184, 186 has access to transmit a frame onto the medium.

One method to control access to the medium is to connect the stations in a logical ring, and to use a token passing protocol to control access to transmit frames on the medium. The medium, the connection into a logical ring, and the stations connected to the medium are referred to as the "ring". An example of a well known token passing protocol is: to have a token, the token is held by a station, and the station holding the token is granted access to transmit on the ring, and after transmitting a last frame on the ring the station passes the token to the next station, and so the token passes around the ring. Also, it is common to require a station transmitting onto the ring to strip from the ring the frames that it transmitted.

The FDDI communications network uses source address stripping. The FDDI network is described in a number of documents produced by the American National Standards Institute (hereinafter ANSI), including: (1), "FDDI Station Management," ANSI/IEEE X3T9/90-078, X3T9.5/84-49, Rev. 6.2, May 18, 1990; (2), "Fiber Distributed Data Interface (FDDI)—Token Ring Media Access Control (MAC)", ANSI/IEEE X3.139-1987; (3), and the physical layer specification is discussed in "ANSI/IEEE standard ANSI X3.148-1988". The FDDI network is a ring topology and the right to transmit is controlled by a token. Capture of the token by a station permits the station to transmit.

Source address stripping used by the FDDI communications network makes use of the source address field SA in a frame. Stripping of frames from the ring proceeds by having each station check all frames detected on the ring, and for each station to strip those frames having the source address field of the frame, SA, correspond to the address of the station.

Source address stripping works well so long as each station has a unique address. In the event that two stations have the same address, the "duplicate address problem", then source address stripping may lead to operational problems with the ring.

Station Addresses

A key feature of Local Area Networks, LAN, and Wide Area Networks, WAN, communications networks is that each station on the network has at least one unique address, and may have several unique addresses. The address is normally used in a MAC layer, of the seven layer ISO communications model, in order to provide an address function of the station.

Various well known LAN communications networks are expected to work together through bridges, etc, and so must have unique station addresses, and include: the IEEE 802 family of protocols, including IEEE 802.3 ETHERNET also known as Carrier Sense Multiple Access/Collision Detect CSMA/CD, IEEE 802.4 Token Bus, and IEEE 802.5 Token Ring; the Fiber Distributed Data Interface FDDI token ring, etc.

Administration of the addresses assignment is partly handled by the Institute of Electrical and Electronic Engineers (hereinafter IEEE), New York, NY. The address space may, for example, be a 48 bit address space. The address space may be broken into sub-address spaces. For example, administration of the addresses is broken into two 47 bit address spaces, a Globally Unique address space and a Locally Administered address space. Each address space has 2**47 addresses. Other sub-address spaces may be defined, for example, there may be an individual station address space and a group address space wherein groups of stations may be identified.

The IEEE handles administration of the Globally Unique address space. The IEEE assigns blocks of addresses to each manufacturer of terminal equipment. The manufacturer then is responsible for assigning a unique individual address from its assigned block of addresses into each station that is manufactured. Each manufacturer then provides a means for the station to "know" its address whenever the station is active on the network. And this means usually provides an automatic assignment of the address to the MAC layer of the station in order to minimize errors in the 48 bit address.

The stations interconnected into networks may be made by many different manufacturers. Conceptually, all stations ever manufactured, by all different manufacturers, must be capable of operating on one communications network. This concept is necessary because it is never known which subset of stations will be connected into a particular combination of local area networks and wide area networks. The administration of the Globally Unique address space addresses by the IEEE assigns unique blocks to equipment manufacturers. Equipment manufacturers insure that each new manufactured station will have a unique address taken from that block so that global interconnection is possible. Also the administration of the Locally Administered address space by network users, managers or owners is also supposed to insure unique addresses.

The Locally Administered address space is managed by either users or address administrators for various networks, organizations, etc. Addresses from the Locally Administered address space are typically handled manually and so are prone to human error.

A frame contains a destination address field DA which identifies the intended receiver station of the frame, or receivers when a group destination address is specified. Also, the frame contains a source address field SA which identifies the transmitter station of the frame.

The source address SA and destination address DA of a frame are detected by a station, and are used by the station for a variety of purposes. The most basic purpose of DA is for detecting frames addressed to the station. The source addresses SA may be used for other purposes such as source address stripping. Additionally, a station may use a frame, including the source address of the frame in ring recovery and initialization protocols. Also, a station may utilize a plurality of addresses for a variety of purposes. Examples of the use of a plurality addresses include: separate addresses for different protocol stacks in a station; as a forwarding table in a bridge; and, by a station for network management purposes, etc.

FDDI Normal Ring Recovery and Initilization

A station begins a ring recovery and initialization process as a result of, for example, some ring disruption, timeout of a timer, etc.

A station begins a ring recovery and initialization process by first entering a claim process by transmitting claim frames. In the event that the claim process fails, the station begins beaconing. Upon successful completion of beaconing, the station again enters the claim process.

Ring recovery normally proceeds as follows:

A. A station which is beaconing continues to do so until:
1. it receives another station's beacon frame, at which time it repeats the other beacon;
2. it receives its own beacon, at which time it begins to emit claim frames.

B. A station emits claim frames until:
1. it receives a beacon frame from another station, at which time it repeats the beacon;
2. it receives a claim frame from another station, and then it either continues to emit its own claim frame or begins repeating the other station's claim frame, according to a set of rules;

C. a station quits claiming when it:
1. receives a claim frame with precedence, according to the rules, and then begins repeating the claim frame with precedence;
2. receives its own claim frame, at which time the station makes a token.

A simple set of rules for determining whether a station, upon receiving a claim frame, either copies the received claim frame or emits its own claim frame is, for example, to determine precedence on the basis of the numerical value of the station address. For example, in token ring networks, it is a common practice for the claim frame having the source address SA field having the largest value to have precedence. And so the receiving station copies the received claim frame if the SA field of the received frame is larger than the address of the station, and if the SA field of the received frame is smaller than the station address then the station emits its own claim frame. This simple rule, leads in normal operation, to the station having the largest value of address to make the token.

The FDDI token ring uses an additional layer of rules in determining precedence by requiring that the stations bid for a timer value. And in the event that there is a tie in bidding for the timer value, the conflict is resolved by the value of the station address.

Duplicate Addresses

It is possible, and almost inevitable, that mistakes in address assignment will be made as many tens of thousands of stations are interconnected. Somewhere someone will enter a wrong address into a station, and two stations will have the same address. For example, an address may be 48 bits long, making (2**48) or 2.8*(10**14) possible addresses. If a worker enters a 1 or a 0 wrong in the 48 bit string in loading an address, then two stations may have the same address. And all approximately 2.8*(10**14) addresses must be capable of operating on one FDDI network because it is unknown what subset will actually be connected into any particular network. A very severe address quality control problem exists in the Locally Administered Address assignments, because manual entry of the bits of the address is permitted.

Ring Disruption by Duplicate Addresses

Severe disruption of the FDDI communications network may occur when two stations have the same address, or a duplicate address occurs in an address table. The disruption occurs because each station uses the source address, SA, in a frame to take action. Actions taken by a station, based on the source address in a frame matching an address in an address table includes, for example, stripping of the frame, and ring recovery and initilization protocol steps.

A station, in doing source address stripping, strips all frames having the source address, SA, of the frame matching any address in the station, including all addresses in the address table of the station.

In the Beaconing step each station tests the continuity of the ring by emitting a "Beacon" frame, and then stripping its "own" frame off the ring. The station identifies its "own" frame by reading the source address SA in the frame header. And if two stations have the same address then each will strip the other's Beacon frames from the ring, thereby interfering with the initialization process. Also, if a station has an address table containing a duplicate address, and the table is used for source address stripping, it will strip the other station's beacon frames from the ring.

However, the "Beacon" process may complete with two stations having duplicate addresses by the two stations stripping each other's Beacon frame and not detecting the duplicate address situation.

After a station removes its "own" Beacon frame, the station begins the "Claim" process in order to determine which station issues the first token. The Claim process proceeds by each station issuing a "Claim" frame and reading all other Claim frames from the other stations, as set forth hereinabove.

The ring can fail to recover and initialize by a station emitting a token as a result of a duplicate address.

An example of a ring failing to recover as a result of a duplicate address situation is given as follows: two stations have the same address; both of the stations begin beaconing; the first station receives its "own" beacon frame from the second station, and begins claiming; the second station receives the claim frame from the first station, ignores the claim frame since it is beaconing, and continues to emit beacon frames; the first station again receives its "own" beacon frame from the second station, continues to claim, and the network is stuck and no token can be made. This condition is called "Claim Beacon Deadlock". Claim beacon deadlock can also occur if one station has the address of another station in an address table.

The rules for claim frame precedence for the FDDI ANSI standard ring are more complex than the above example, and are as follows. Each Claim frame has two operative parts, a first part called "Target Token Rotation Time" (hereinafter TTRT), and a second part consisting of the station address. The TTRT is a value given to the MAC layer by higher layers, and is a value that the higher layers have determined would be a useful value for that particular station considering its frame loading, etc.

In arbitrating for the right to issue a first token, the station bidding the smallest value of TTRT wins the right to issue the first token, and all stations have their Token Rotation Timers (hereinafter TRT) set to the winning TTRT value. The Target Token Rotation Timer value TTRT is the maximum length of time that a station may hold a token during transmission.

In the event that two stations bid the same value of TTRT, the bidding is decided on the basis of the length of the address and then on the basis of the value of the address. Winning of the arbitration for the right to issue the first token is determined by the following three rules:

1. The bid with the lowest Target Token Rotation Time (TTRT) has precedence (i.e. the numerically lowest bid value for TTRT.

2. Given equal TTRT values in bidding, the bid with the largest address has precedence, (that is, a station with a 48 bit address wins over a station with a 16 bit address);

3. Given equal bid values for TTRT and equal address lengths, the bid with the highest address has precedence (i.e., the numerically highest address).

The principal bidding in the claim process is on the basis of the value of the station address. Although in FDDI the stations bid for TTRT in order to determine which station will issue the first token, in many other token controlled communications networks the value of TRT is fixed and the bidding for the station to create the first token is based entirely on the value of the station address.

The duplicate address problem in the FDDI network is particularly severe when the winning bid in the Claim process is by two stations having numerically identical addresses. If the two duplicates have bid different values for TTRT, one duplicate will have the winning bid value of TTRT. Each station strips the other's Claim frames. The station with the winning TTRT will never receive its Claim frames containing the winning bid TTRT value, and so a token will never be issued. Thus, the FDDI Ring will never become operational.

A duplicate address situation causes further problems if the two duplicates have the same bid value for TTRT, as both stations will "win" the Claiming process. Accordingly, both stations will start transmitting "Claim" frames. A first duplicate station will receive the Claim frame from its duplicate and will issue a token. The second duplicate station may receive a complete Claim frame and issue a second token, making two tokens circulating on the FDDI ring. Two tokens on the ring is an error condition, but may not be fatal to the ring because if a station receives a token during transmission of frames, it simple strips the token and does not repeat it. Alternatively, the second duplicate station may receive a token before it transmits a complete Claim frame, and so the second duplicate station will detect an error condition and therefore commence an initialization of the FDDI ring. Again, the FDDI ring repeatadly initializes rather than enters stable operation.

Solutions to Duplicate Address Problem

Four conditions that are indicative of the existence of a duplicate address problem are:

1. A first station receiving its "own" Beacon while Claiming for longer than the maximum delay of the FDDI ring. This condition indicates that another duplicate is Beaconing and the first station is Claiming.

2. A first station receiving its own Claim frame while Beaconing for longer than maximum delay of the FDDI ring. This condition indicates that another duplicate is Claiming while the station is Beaconing.

3. A first station Receiving its own Claim frame while not Claiming. This condition indicates that both duplicates have the same winning bid of Target Token Rotation Time (TTRT) and address combination. The first station has stopped Claiming and issued a token, while the other duplicate station continues to Claim.

4. A first station receiving valid Claim Frames with its "own" address and different bid value for TTRT.

This condition indicates duplicates with different TTRT values are both Claiming.

These four conditions are included in "FDDI Station Management SMT" Rev. 6.2 mentioned hereinabove as a standard Ring Management Technique (hereinafter RMT). An examination of these conditions shows that they require a protocol to carry out the test steps in Beacon or Claim frame passing through a station, where the protocol is performed by software or speciality hardware.

As a further example, RMT has no cyclical redundancy check, CRC. And so to prevent data errors from being mistaken for duplicate addresses, RMT examines the source address field SA of several successive frames. If the SA field of several successive frames agree, then the protocol assumes that the SA field has been correctly read, and the protocol can then make decisions about duplicate addresses. That is, in this example, the RMT protocol responds to steady state ring conditions because of the absence of cyclical redundancy check in the RMT protocol.

The implementation of RMT, as set out in the ANSI standards for FDDI referenced hereinabove, involves comparing many received Claim and Beacon frames to the frames sourced by this MAC. Three steps are necessary before the conditions may be applied. It will be readily apparent how to perform these steps, to a person skilled in the art of the FDDI specifications as hereinabove referenced. First, the state of the MAC transmitter is ascertained, including the SA of a received frame, information contained in transmitted frames, and whether MAC is sending claim frames, beacon frames, or repeating frames from another station. Second, several of the received frames are stored in memory. A special mode of operation is briefly enabled to receive Claim or Beacon frames, as Claim or Beacon frames are not normally received. Third, the state of MAC is verified to have been constant for the sample of frames. If so, the four detection conditions are applied to the MAC transmitter state and received frame contents. The SA in each received frame is compared to the list of addresses used (and therefore stripped) by this station. If a match is found, the transmitter state is used to determine if the frame was transmitted by this station. A duplicate address problem is detected when the SA of the received frame matches the list of address but was not recently transmitted. A single such frame is ignored as it may have been created by errors on the media, but many such frames indicate a duplicate address condition has been detected by the RMT process. The above process must be repeated often enough to meet the reaction time specified for RMT, roughly 80 milliseconds.

While the invention has been particularly shown and described with reference to the particular embodiments described hereinabove, it will be understood by those skilled in the art that various changes in form and details may be made therein without departing from the spirit and scope of the invention.

What is claimed is:

1. An apparatus to detect stations having duplicate addresses, said stations of the type connected in a computer communications network, comprising:

means for doing a neighbor response test, and for setting a logical variable "neighbor indicator" to a value in response to a result of said neighbor response test;

means for doing a transmit self test, and for setting a logical variable "self indicator" to a value in response to a result of said transmit self test;

means, responsive to said neighbor indicator and responsive to said self indicator, for setting a duplicate address indicator in one of three states, a first state of said three states indicating that there is no duplicate address detected, a second state of said three states indicating that there is a duplicate address, and a third state of said three sates indicating an unknown condition.

2. An apparatus to detect stations having duplicate addresses, said stations of the type connected in a computer communications network, comprising:

means for doing a transmit self test, and for setting a self indicator to pass in the event that the frame is received, and for setting said self indicator to timeout in the event that a timeout occurs;

means for doing a neighbor response test, and for setting a neighbor indicator to timeout in the event that a timeout occurs, and for setting said neighbor indicator to pass in the event that a received response frame indicates no destination address match, and for setting said neighbor indicator to fail in the event that a received response frame indicates that a destination address match occurred;

means for testing both said self indicator and for testing said neighbor indicator, and in response to said testing of said self indicator and said testing of said neighbor indicator for setting a duplicate address indicator in one of three states, a first state of said three states indicating that there is no duplicate address detected, a second state of said three states indicating that there is a duplicate address, and a third state of said three states indicating an unknown condition.

3. An apparatus to detect stations having duplicate addresses, said stations of the type connected in a computer communications network, comprising:

means in a first station for doing a neighbor response test, said neighbor response test having said first station transmit a first inquiry frame on said network, and for setting a neighbor indicator to timeout in the event that a timeout occurs, and for setting said neighbor indicator to pass in the event that a received response frame indicates no destination address match, and for setting said neighbor indicator to fail in the event that a received response frame indicates that a destination address match occurred;

means for doing a transmit self test, using a second inquiry frame for said self test, and for setting a self indicator to pass in the event that said second inquiry frame is received by said first station, and for setting said self indicator to timeout in the event that a timeout occurs;

means for testing both said self indicator and for testing said neighbor indicator, and in response to said testing of said self indicator and said testing of said neighbor indicator for setting a duplicate address indicator in one of three states, a first state of said three states indicating that there is no duplicate address detected, a second state of said three states indicating that there is a duplicate address, and a third state of said three states indicating an unknown condition.

4. An apparatus to detect a station having duplicate addresses, said stations of the type connected in a computer communications network, comprising:
- means for a first station to transmit a test frame to itself by placing an address of said first station in a destination address field of said test frame;
- means, responsive to said first station receiving said test frame, for said first station to set a self indicator to a pass condition;
- means, responsive to said first station not receiving said test frame within a first predetermined timeout time interval, for said first station to set said self indicator to a timeout condition;
- means for said first station to transmit an inquiry frame, said inquiry frame having a multicast destination address, said inquiry frame having a received indicator field having a "received" condition and "not received" condition, and said received indicator set to said "not received" condition upon transmission by said first station;
- means for a second station to receive said inquiry frame and to repeat said inquiry frame on said network;
- means for said second station to check said received field, and in the event that said received field is set to "not received", to set said received field to "received" and to transmit a response frame, said response frame having a destination address field and an address of said first station placed in said destination address field, and in the event that said received field indicates a "received" condition, to only repeat said inquiry frame, so that only the downstream neighbor station of said first station transmits a response frame;
- match flag means in said response frame to indicate a match between said destination address field of said response frame with an address in a station that detects said response frame as said response frame travels from station to station on said ring, said match flag means set to a "reset" condition when said response frame is created by said second station;
- means in a station detecting said response frame, in response to an event that said destination address in said response frame corresponds to an address in a list of addresses in said station detecting said response frame or to a station address in said station detecting said response frame, for setting said match flag means to a "set" condition, and for leaving said match flag means in said "reset" condition in the event that there is no match between said destination address of said response frame and said addresses in said station detecting said response frame;
- means in said first station for receiving said response frame, and for testing said match flag means, and in response to said match flag means indicating "set", for setting a neighbor indicator to fail, thereby showing that another station had a match with said address of said first station;
- means in said first station, in response to said match flag means being set to said "reset" condition indicating that no duplicate address was detected, for setting said neighbor indicator to pass;
- means in said first station, in response to not receiving said response frame within a second predetermined timeout time interval, for setting said neighbor indicator to a condition indicating timeout;
- means in said first station for testing both said self indicator and for testing said neighbor indicator, and in response to said testing of said self indicator and said testing of said neighbor indicator for setting a duplicate address indicator in one of three states, a first state of said three states indicating that there is no duplicate address detected, a second state of said three states indicating that a duplicate address was detected, and said third state of said three states indicating an unknown condition.

5. The apparatus as in claim 1 or claim 2 or claim 3, or claim 4, wherein:
said means for setting a duplicate address indicator sets a duplicate address indicator into a one of said three states in accordance with the following table,

| Condition | Neighbor Indicator | Self Indicator | Duplicate Address Indicator |
|---|---|---|---|
| 1[.] | timeout | timeout | unknown |
| 2[.] | timeout | pass | pass |
| 3[.] | pass | timeout | unknown |
| 4[.] | pass | pass | pass |
| 5[.] | fail | timeout | fai |
| 6[.] | fail | pass | pass | said duplicate address indicator indicating no duplicate address detected by said pass condition, and indicating a duplicate address detected by said fail condition, and indicating that the test is inconclusive by said unknown condition.

6. The apparatus as in claims 1 or 2 or 3
means for concurrently running said transmit self test and said neighbor response test.

7. The apparatus as in claim 6 further comprising:
means for using a latest value of a result of said transmit self test and said neighbor response test upon completion of either said concurrently running said transmit self test or said neighbor response test in said setting said duplicate address indicator in said one of said three states, said latest value of a result being determined by the latest completion of said concurrently running said transmit self test or said neighbor response test.

8. The apparatus as in claim 1 or claim 2 or claim 3, or claim 4, further comprising:
means for setting said neighbor indicator into an unknown condition upon the event of power up;
means for setting said self indicator into an unknown condition upon the event of power up;
said means for setting a duplicate address indicator sets a duplicate address indicator into a one of said three states in accordance with the following table,

| Condition | Neighbor Indicator | Self Indicator | Duplicate Address Indicator |
|---|---|---|---|
| 1[.] | unknown or timeout | unknown or timeout | unknown |
| 2[.] | unknown or timeout | pass | pass |
| 3[.] | pass | unknown or timeout | unknown |
| 4[.] | pass | pass | pass |
| 5[.] | fail | unknown or timout | fail |
| 6[.] | fail | pass | pass | said duplicate address indicator indicating no duplicate address detected by said pass condition, and indicating a duplicate address detected by said fail condition, and indicating that the test is inconclusive by said unknown condition.

* * * * *